Aug. 26, 1941.   A. C. WINTERHALTER   2,253,830

CABLE CONNECTOR

Filed Feb. 21, 1939

WITNESS:

INVENTOR
Alfred C. Winterhalter
BY
ATTORNEYS.

Patented Aug. 26, 1941

2,253,830

UNITED STATES PATENT OFFICE 2,253,830

CABLE CONNECTOR

Alfred C. Winterhalter, Beaumont, Tex., assignor to Sun Oil Company, Philadelphia, Pa., a corporation of New Jersey Application February 21, 1939, Serial No. 257,589

8 Claims. (Cl. 173—324)

This invention relates to a cable connector designed particularly for effecting connections with some of the wires of a cable intermediate the ends of the cable.

In certain instances it becomes desirable to make connections to a small number of wires of an electrical cable at points substantially distant from the ends of the cable. For example, in recent seismographic exploration practice it has become customary to have running to a recording instrument truck a multi-conductor cable extending adjacent a number of detector stations at each of which there may be one or a plurality of conductors to be connected to the cable. This practice has developed a number of practical problems in laying out and picking up such a line and in making connections in an expeditious and foolproof manner at the various stations. In order to avoid mixups, and permit ready reeling it is not desirable to break the cable at the various stations and provide connectors for the cable sections, but preferably it is desirable to run a single cable throughout and have at various points along its length means for connecting to the interior wires the particular apparatus at the various stations. These stations are usually about 200 feet apart.

It is the object of the present invention to provide cable connecting means adapted to be used under the circumstances just indicated and similar circumstances where connections must be made at intervals to various selected wires within a cable. The improved connecting means is of such nature as to offer substantially no appreciable projection from the cable so that the cable may be freely dragged along the ground without danger of having it catch on objects in its path and also without having the connecting means damaged by such handling or by the reeling of the cable.

It is also sometimes desirable to have semi-permanent connections made to a cable in such fashion that the main cable and an associated cable may be dragged together along the ground and also perhaps reeled up simultaneously. In accordance with the present invention this is also made possible.

The above objects of the invention, and more specific objects relating particularly to details, for example, the provision of means to insure that incorrect connections will not be made, will be apparent from the following description, read in conjunction with the accompanying drawing, in which.

Figure 1:
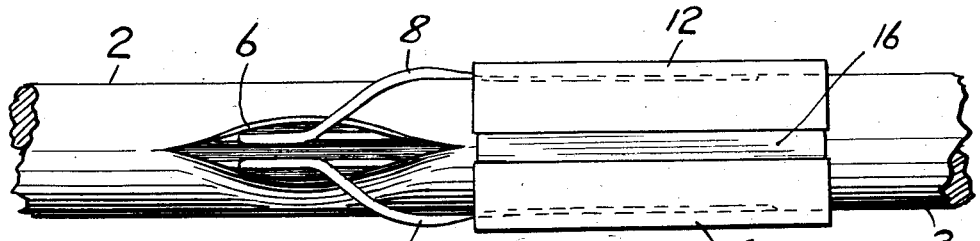
Figure 1 is an elevation of a portion of the cable carrying the connecting means, but in a partially finished condition.

There is indicated at 2 a multi-conductor cable containing a number of insulated wires indicated at 4 to which cable it is desired to make connections with a pair of wires therein at a point intermediate the ends thereof. While the invention will be specifically described as applied to connections made to two wires at one point, it will be obvious that by slight modification connections to more than two wires may be made at one point. In general, however, if connections in a given region are to be made to more than two wires, it will be desirable to provide a plurality of connecting means fairly close to each other, but connected in pairs to various wires.

The improved connecting means will be best understood from a consideration of the steps in its preparation. The outer insulation of the cable may be opened as indicated at 6 and the wires to which connections are to be made exposed through the opening. To these wires are electrically connected, by soldering or otherwise, extension wires 8 and 10, which are desirably insulated. The junctions of these extension wires to the wires within the cable should also be suitably insulated as will be readily understood. The extension wires 8 and 10 are electrically connected by soldering or otherwise to conducting members 12 and 14, which are arranged to embrace opposite sides of the exterior of the insulated cable 2. Longitudinally extending spacers 16 of insulating material are preferably located between the adjacent portions of the members 12 and 14 to insulate them from each other. Following such assembly, insulating tape may be wound about the cable and the ends of the members 12 and 14 and also about the opening 6, as indicated at 18 and 20, there being left between the ends of the wrapping exposed portions of the members 12 and 14.

Figure 2:
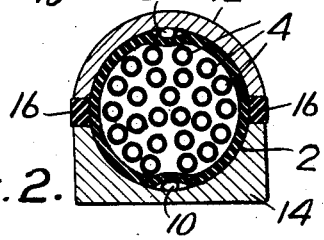
Figure 2 is a transverse section through said connecting means.
Figure 3:
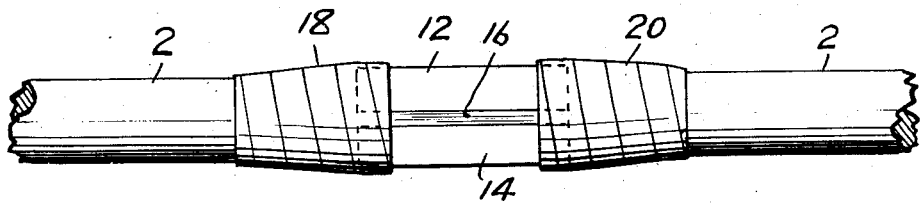
Figure 3 is a view similar to Figure 1, but on a smaller scale, showing the appearance of the finished connection.

As will be clear from the section in Figure 2 the member 12 presents an exterior cylindrical surface concentric with the surface of the cable, whereas the member 14 presents a flat outer surface. Such dissimilar exterior conducting surfaces are desirable to prevent accidental incorrect reversal of the connections. While the arrangement of cylindrical and flat surfaces is convenient, as will be apparent below, it is obvious that other dissimilar exterior conducting surfaces will effect substantially the same results.

Figures 4, 5:
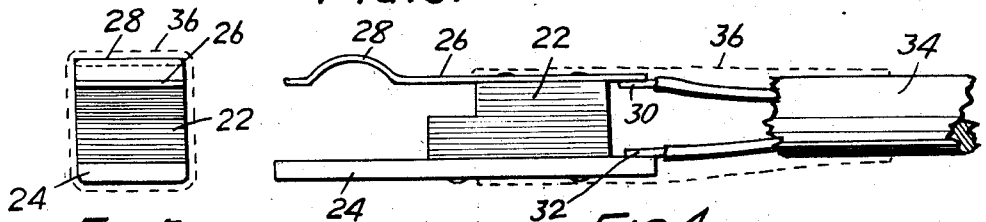
Figure 4 is an elevation showing a cooperating connector carried by a second cable.
Figure 5 is an end elevation of the same.

For connection with the connecting means just described, there is provided the clamping member illustrated in Figures 4 and 5. This preferably comprises an insulating block 22 to which are affixed by screws or rivets a relatively rigid conductor element 24 and a flexible conductor element 26, which is provided with an arcuate depression indicated at 28 designed to embrace the exterior of the member 12. The member 14 has its inner face flat so as to engage in flatwise fashion the surface of the member 12. By reason of the resilience of the element 26, it will be obvious that the connector illustrated in Figures 4 and 5 may be slipped over the members 12 and 14 and will closely engage the same to provide proper electrical contacts. It will be obvious that a reversal of the connections would be readily noticeable and would not normally be made. The members 24 and 26 are suitably connected to the ends of wires 32 and 30 within a cable 34. The entire assembly may be provided with a sleeve of insulating material as indicated at 36 so as to leave exposed only the ends of the conducting clamping elements 24 and 26.

Figure 6:
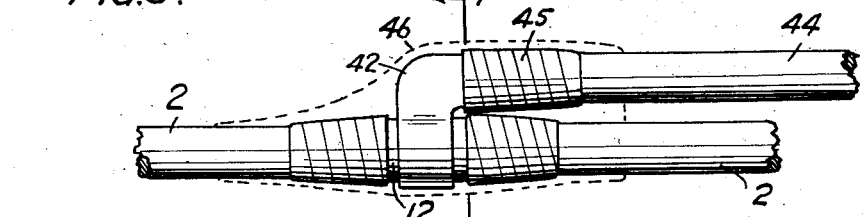
Figure 6 is a plan view showing an alternative form of cooperating connectors whereby two connected cables may be located parallel to each other adjacent the connection.
Figure 7:
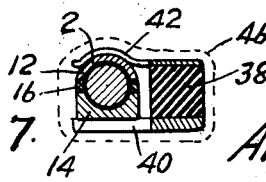
Figure 7 is a transverse section taken on the plane the trace of which is indicated at 7—7 in Figure 6.

The last named connector is satisfactory where the cable 34 may be permitted to extend substantially at right angles to the cable 2. In some instances, however, it is desirable that a junction be made which is of a semi-permanent nature, in which case it is desirable that the two cables should extend substantially parallel to each other at the joint so that the assembly may be dragged over the ground or reeled up without difficulty or damage. Under such circumstances a block of insulating material such as 38 corresponding to the block 22 may have extending from it at right angles to a cable 44 clamping conductors such as 40 and 42 connected to wires within the cable 44. The junction may be taped as indicated at 45 and the final assembly wrapped with tape or otherwise covered with an insulating sleeve indicated at 46. As will be obvious from Figure 6, the resulting structure may be smoothed out in such fashion that it may be drawn over the ground without danger of entanglement.

It will be obvious that the invention may be embodied in other modifications than those specifically disclosed. By the use of asymmetrical connecting arrangements and with proper care in initial assembly, it will be obvious that polarized connections may be made without any reasonable probability that the connections will be incorrectly made. Various spring arrangements may be provided. For example, the spring elements may be made of a plurality of leaves to secure better flexibility and, at the same time, better contact.

What I claim and desire to protect by Letters Patent is:

1. Cable connecting means comprising a plurality of concave conducting members arranged to embrace portions of the exterior of an insulated cable, means for electrically connecting each of said members to a wire within the cable, and means for holding said members upon the cable on opposite sides thereof and in spaced insulated relation with each other said holding means comprising insulating wrappings engageable with the cable and with the ends of said conducting members, and longitudinally extending insulating members between said conducting members to insulate them from each other.

2. Cable connecting means comprising a plurality of concave conducting members arranged to embrace portions of the exterior of an insulated cable, means for holding said members upon the cable on opposite sides thereof and in spaced insulated relation with each other, means for electrically connecting each of said members to a wire within the cable, and means adapted to yieldingly clamp the exterior of said conducting members to provide electrical connections therewith, said last named means comprising elements extending substantially at right angles with respect to a second cable and yieldingly urged toward each other to effect clamping engagement with said conducting members while extending substantially at right angles with respect to said first cable, whereby when connection is effected said cables will lie substantially parallel with each other adjacent the connection.

3. Cable connecting means comprising a plurality of concave contacting members arranged to embrace portions of the exterior of an insulated cable, means for holding said members upon the cable on opposite sides thereof and in spaced insulated relation with each other, means for electrically connecting each of said members to a wire within the cable, said members presenting dissimilar exterior connecting surfaces, and cooperating elements yieldingly urged toward each other and presenting dissimilar interior conducting surfaces for respective engagement with the exterior conducting surfaces of said members.

4. Cable connecting means comprising a plurality of concave conducting members arranged jointly to embrace the major portion of the circumference of the exterior of an insulated cable, means for holding said members directly opposite each other upon the sides of the cable with their longitudinal edges in spaced insulated relationship with each other, and means for electrically connecting each of said members to a wire within the cable.

5. Cable connecting means comprising a plurality of concave conducting members arranged to embrace portions of the exterior of an insulated cable, means for holding said members directly opposite each other upon the sides of the cable with their longitudinal edges in spaced insulated relationship with each other, and means for electrically connecting each of said members to a wire within the cable, said members presenting dissimilar exterior conducting surfaces for engagement with cooperating connector elements.

6. Cable connecting means comprising a plurality of concave conducting members arranged to embrace portions of the exterior of an insulated cable, means for holding said members directly opposite each other upon the sides of the cable with their longitudinal edges in spaced insulated relationship with each other, and means for electrically connecting each of said members to a wire within the cable, at least one of said members presenting a flat surface opposite its concave surface for engagement with a cooperating conductor element.

7. Cable connecting means comprising a plurality of concave conducting members arranged jointly to embrace the major portion of the circumference of the exterior of an insulated cable, means for electrically connecting each of said members to a wire within the cable, and means for holding said members directly opposite each other upon the sides of the cable with their longitudinal edges in spaced insulated relationship with each other, said holding means comprising wrappings engageable with the cable and with the ends of said conducting members.

8. Cable connecting means comprising a plurality of concave conducting members arranged to embrace portions of the exterior of an insulated cable, means for holding said members directly opposite each other upon the sides of the cable with their longitudinal edges in spaced insulated relationship with each other, means for electrically connecting each of said members to a wire within the cable, and means adapted to yieldingly clamp the opposite exterior portions of said conducting members to provide electrical connections therewith.

ALFRED C. WINTERHALTER.